(12) United States Patent
Agarwal et al.

(10) Patent No.: US 11,863,623 B2
(45) Date of Patent: Jan. 2, 2024

(54) VARIABLE QOS MANAGEMENT OF MULTIPLE DATA STREAMS

(71) Applicant: Western Digital Technologies, Inc., San Jose, CA (US)

(72) Inventors: Dinesh Kumar Agarwal, Bangalore (IN); Amit Sharma, Bengaluru (IN)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/183,826

(22) Filed: Feb. 24, 2021

(65) Prior Publication Data

US 2022/0086225 A1    Mar. 17, 2022

Related U.S. Application Data

(60) Provisional application No. 63/077,278, filed on Sep. 11, 2020.

(51) Int. Cl.
| | |
|---|---|
| *H04L 67/1097* | (2022.01) |
| *H04L 67/125* | (2022.01) |
| *H04L 43/0852* | (2022.01) |
| *H04L 41/22* | (2022.01) |
| *H04L 43/0817* | (2022.01) |

(Continued)

(52) U.S. Cl.
CPC .......... *H04L 67/1097* (2013.01); *H04L 41/22* (2013.01); *H04L 41/5003* (2013.01); *H04L 43/0817* (2013.01); *H04L 43/0852* (2013.01); *H04L 67/125* (2013.01); *H04L 67/61* (2022.05)

(58) Field of Classification Search
CPC . H04L 67/1097; H04L 41/22; H04L 41/5003; H04L 43/0817; H04L 43/0852; H04L 67/125; H04L 67/322; H04L 67/01; H04L 67/51
See application file for complete search history.

(56) References Cited

U.S. PATENT DOCUMENTS

| | | | | |
|---|---|---|---|---|
| 5,551,046 A | * | 8/1996 | Mohan | ...... G06F 9/52 711/119 |
| 5,606,688 A | * | 2/1997 | McNutt | ...... G06F 12/121 711/170 |

(Continued)

FOREIGN PATENT DOCUMENTS

WO    WO-2015044104 A1 *    4/2015    ......... H04L 65/4084

*Primary Examiner* — Jonathan A Bui
(74) *Attorney, Agent, or Firm* — Rutan & Tucker LLP; Hani Z. Sayed; Ravi Mohan

(57) ABSTRACT

Storage devices and systems are capable of dynamically managing QoS requirements associated with host applications via a management interface. The management interface may the enable storage devices to: (i) decide which data needs to be transferred back to the hosts, (ii) choose to skip portions of the data transferred back to the hosts to improve throughput and maintain low cost, and (iii) operate contention resolutions with host applications. Furthermore, storage devices and systems may achieve a virtual throughput that may be greater than its actual physical throughput. The management interface may also be operated at an application level, which advantageously allows the devices and systems the capabilities of managing contention resolutions of host applications, and managing (changing, observing, fetching, etc.) one or more QoS requirements for each host application.

18 Claims, 8 Drawing Sheets

(51) Int. Cl.
  *H04L 41/5003*   (2022.01)
  *H04L 67/61*    (2022.01)

(56)           References Cited

U.S. PATENT DOCUMENTS

|  |  |  |  |
|---|---|---|---|
| 6,842,826 B1* | 1/2005 | McNutt | G06F 12/123 |
| | | | 711/E12.072 |
| 9,450,879 B2 | 9/2016 | Rector | |
| 10,216,423 B1* | 2/2019 | Malwankar | G06F 3/064 |
| 10,929,028 B2* | 2/2021 | Kim | G06F 3/0659 |
| 2013/0297816 A1* | 11/2013 | Chaturvedi | H04L 65/764 |
| | | | 709/231 |
| 2017/0264719 A1* | 9/2017 | Koramutla | H04L 65/80 |
| 2017/0272494 A1* | 9/2017 | Huen | G06F 3/0659 |
| 2018/0059988 A1* | 3/2018 | Shivanand | G06F 3/0659 |
| 2018/0113642 A1* | 4/2018 | Huen | G06F 3/0605 |
| 2018/0275923 A1* | 9/2018 | Earhart | G06F 3/0604 |
| 2019/0138212 A1 | 5/2019 | Hashimoto et al. | |
| 2019/0324658 A1 | 10/2019 | Walsh | |
| 2020/0081743 A1* | 3/2020 | Hu | G06F 9/5016 |
| 2020/0167097 A1* | 5/2020 | Huen | G06F 3/0659 |

\* cited by examiner

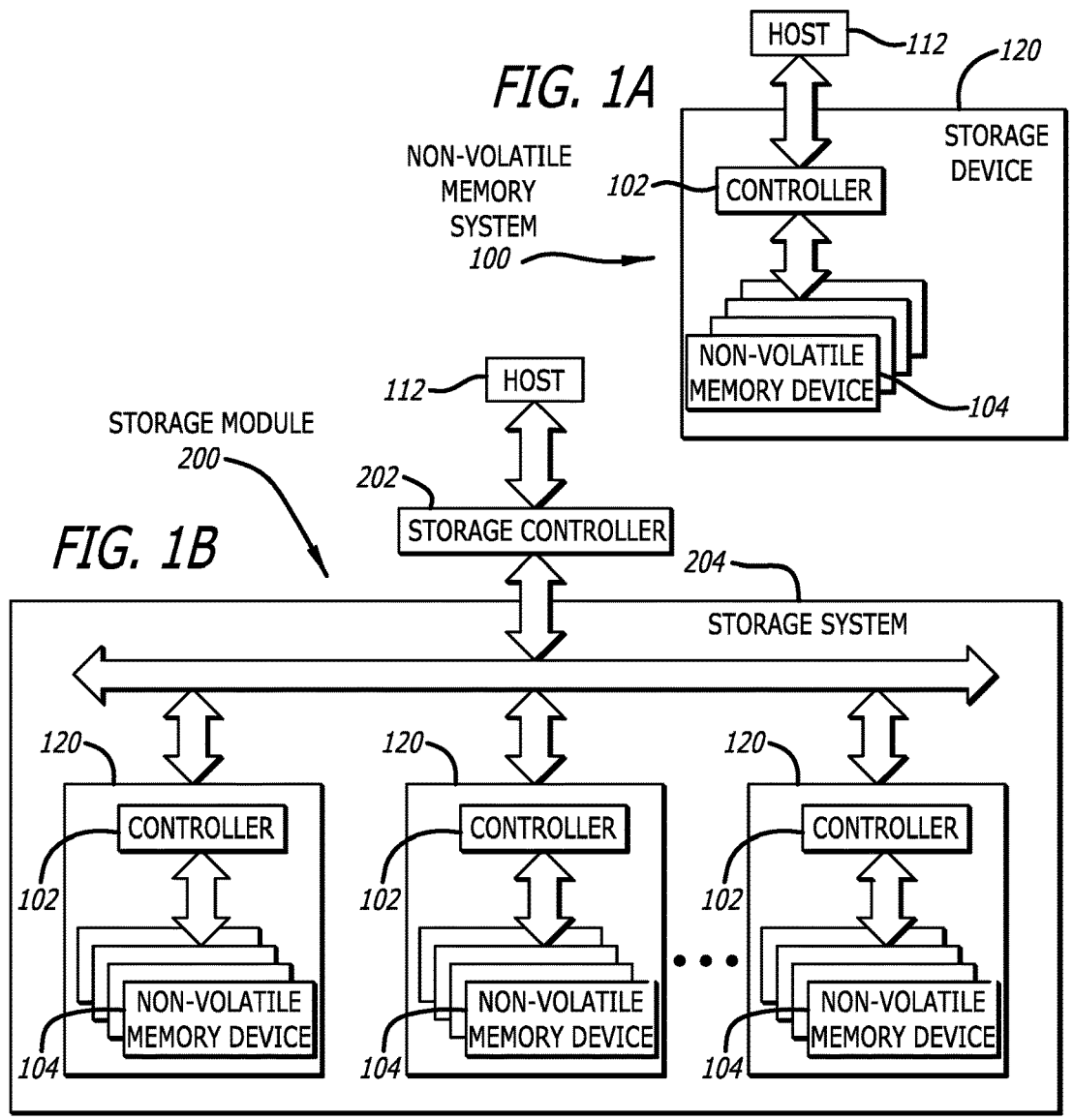
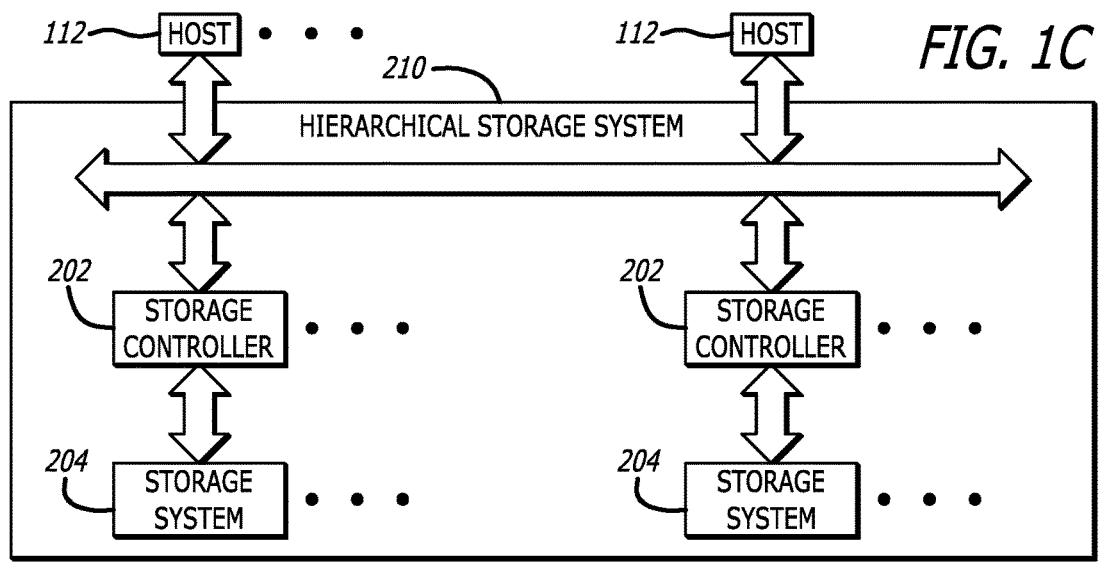

VARIABLE QOS MANAGEMENT OF MULTIPLE DATA STREAMS

PRIORITY

This application claims the benefit of priority to U.S. Provisional Application No. 63/077,278, filed Sep. 11, 2020, which is incorporated in its entirety herein.

FIELD

The embodiments of the present disclosure relate to storage devices. More particularly, the embodiments relate to storage devices that dynamically manage the Quality of Service (QoS) of multiple data streams.

BACKGROUND

Solid-state drives (SSDs) and multi-streaming SSDs are commonly used storage devices typically found in electronic systems ranging from consumer products to enterprise-level computer systems. The market for SSDs has increased and its acceptance for use by private enterprises and government agencies to store data is becoming more widespread. Consequently, large storage systems such as data centers and cloud storage providers have become necessary to store and retrieve large quantities of data for a multitude of clients across various industries using any number of varying applications. The requirements regarding how quickly data is stored or retrieved can vary significantly depending on the client and application. These requirements typically are in the form of Service Level Agreements (SLAs) between the client and the storage provider. SLAs typically define a minimum Quality of Service (QoS) for a particular user, application, or individual data stream. QoS comprises the performance properties and attributes for data reads and writes, including latency and throughput.

QoS attributes, however, are mainly supported by the host. Any QoS attributes concerning multi-streaming and the software that generates stream requests is directly supported by the hosts or its service providers. In this environment, user devices or applications are allocated network bandwidth, processor bandwidth, and storage size by the host. Based on the minimum QoS requirements established by the hosts, user devices generally need to be tuned to meet certain QoS attributes and throughput. Moreover, if the host demands a high throughput for an application or provides a minimum QoS that needs to be maintained per application, then the user may observe stuttering if the device is not able to be tuned to satisfy the high throughput and minimum QoS requirements.

BRIEF DESCRIPTION OF DRAWINGS

The above, and other, aspects, features, and advantages of several embodiments of the present disclosure will be more apparent from the following description as presented in conjunction with the following several figures of the drawings.

FIG. 1A illustrates an exemplary block diagram of a non-volatile memory system with a non-volatile memory, a storage device, and a controller, in accordance with an embodiment of the disclosure;

FIG. 1B illustrates an exemplary block diagram of a storage module with a storage system that has a plurality of storage devices, in accordance with an embodiment of the disclosure;

FIG. 1C illustrates an exemplary block diagram of a hierarchical storage system, in accordance with an embodiment of the disclosure;

DETAILED DESCRIPTION

Figure 2:
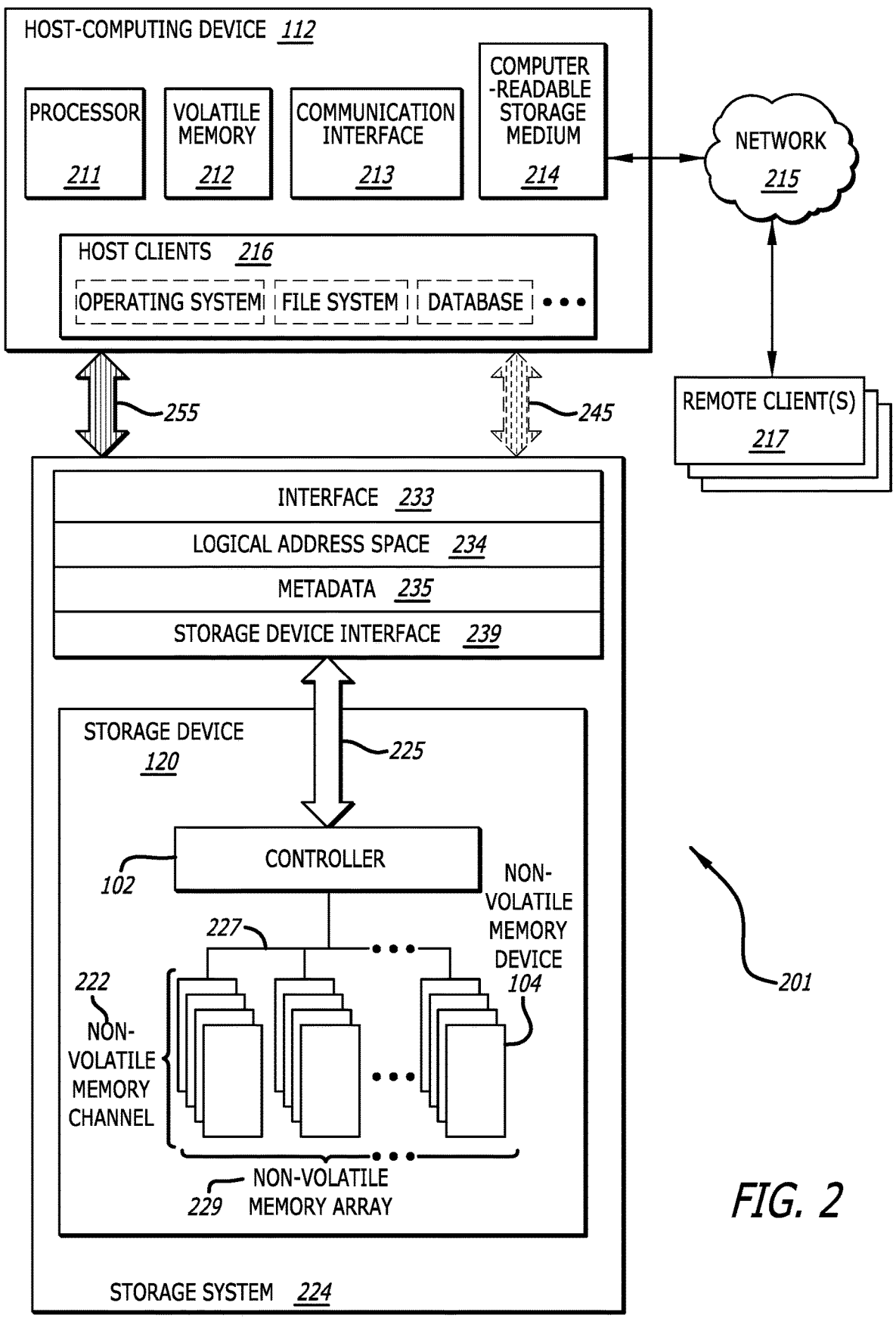
FIG. 2 illustrates a schematic block diagram of a system with a host-computing device and a storage device, in accordance with an embodiment of the disclosure.

The embodiments described herein relate to storage devices, systems, and related methods for dynamically managing various host applications (e.g., data streams) based on minimum QoS requirements. Additionally, as described in greater detail below, these embodiments provide storage devices and systems the advantage of being able to dynamically manage and change QoS requirements associated with host applications. Embodiments of the dynamic QoS management interface also enable storage devices with the capabilities to: (i) decide which data needs to be transferred back to the hosts, (ii) choose to skip portions of the data transferred back to the hosts to improve throughput and maintain low cost, and (iii) operate contention resolutions with host applications.

Accordingly, the embodiments described herein allow storage devices and systems to have a virtual throughput that may be greater than its actual physical throughput. For example, if an actual physical throughput is equal to "X" (the total amount of data transferred by a device to a host), a corresponding virtual throughput "Y" can be up to twice the "X" amount of data acknowledged by the device based on the QoS applications (i.e., the virtual throughput Y=2X). In some embodiments, the storage devices and systems are capable of scheduling and arbitration of data associated with the QoS host applications. In additional embodiments, the storage devices and systems are capable of operating the dynamic QoS management interface at the application level, which advantageously allows the devices and systems the capabilities of managing contention resolutions of host applications, and managing (changing, observing, fetching, etc.) one or more QoS requirements for each host application.

Aspects of the present disclosure may be embodied as an apparatus, system, method, or computer program product. Accordingly, aspects of the present disclosure may take the form of an entirely hardware embodiment, an entirely software embodiment (including firmware, resident software, micro-code, or the like) or an embodiment combining software and hardware aspects that may all generally be referred to herein as a "function," "module," "apparatus," or "system." Furthermore, aspects of the present disclosure may take the form of a computer program product embodied in one or more non-transitory computer-readable storage media storing computer-readable and/or executable program code. Many of the functional units described in this specification have been labeled as functions, in order to emphasize their implementation independence more particularly. For example, a function may be implemented as a hardware circuit comprising custom VLSI circuits or gate arrays, off-the-shelf semiconductors such as logic chips, transistors, or other discrete components. A function may also be implemented in programmable hardware devices such as via field programmable gate arrays, programmable array logic, programmable logic devices, or the like.

Functions may also be implemented at least partially in software for execution by various types of processors. An identified function of executable code may, for instance, comprise one or more physical or logical blocks of computer instructions that may, for instance, be organized as an object, procedure, or function. Nevertheless, the executables of an identified function need not be physically located together but may comprise disparate instructions stored in different locations which, when joined logically together, comprise the function and achieve the stated purpose for the function.

Indeed, a function of executable code may include a single instruction, or many instructions, and may even be distributed over several different code segments, among different programs, across several storage devices, or the like. Where a function or portions of a function are implemented in software, the software portions may be stored on one or more computer-readable and/or executable storage media. Any combination of one or more computer-readable storage media may be utilized. A computer-readable storage medium may include, for example, but not limited to, an electronic, magnetic, optical, electromagnetic, infrared, or semiconductor system, apparatus, or device, or any suitable combination of the foregoing, but would not include propagating signals. In the context of this document, a computer readable and/or executable storage medium may be any tangible and/or non-transitory medium that may contain or store a program for use by or in connection with an instruction execution system, apparatus, processor, or device.

Computer program code for carrying out operations for aspects of the present disclosure may be written in any combination of one or more programming languages, including an object-oriented programming language such as Python, Java, Smalltalk, C++, C#, Objective C, or the like, conventional procedural programming languages, such as the "C" programming language, scripting programming languages, and/or other similar programming languages. The program code may execute partly or entirely on one or more of a user's computer and/or on a remote computer or server over a data network or the like.

A component, as used herein, comprises a tangible, physical, non-transitory device. For example, a component may be implemented as a hardware logic circuit comprising custom VLSI circuits, gate arrays, or other integrated circuits; off-the-shelf semiconductors such as logic chips, transistors, or other discrete devices; and/or other mechanical or electrical devices. A component may also be implemented in programmable hardware devices such as field programmable gate arrays, programmable array logic, programmable logic devices, or the like. A component may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may alternatively be embodied by or implemented as a component.

A circuit, as used herein, comprises a set of one or more electrical and/or electronic components providing one or more pathways for electrical current. In certain embodiments, a circuit may include a return pathway for electrical current, so that the circuit is a closed loop. In another embodiment, however, a set of components that does not include a return pathway for electrical current may be referred to as a circuit (e.g., an open loop). For example, an integrated circuit may be referred to as a circuit regardless of whether the integrated circuit is coupled to ground (as a return pathway for electrical current) or not. In various embodiments, a circuit may include a portion of an integrated circuit, an integrated circuit, a set of integrated circuits, a set of non-integrated electrical and/or electrical components with or without integrated circuit devices, or the like. In one embodiment, a circuit may include custom VLSI circuits, gate arrays, logic circuits, or other integrated circuits; off-the-shelf semiconductors such as logic chips, transistors, or other discrete devices; and/or other mechanical or electrical devices. A circuit may also be implemented as a synthesized circuit in a programmable hardware device such as field programmable gate array, programmable array logic, programmable logic device, or the like (e.g., as firmware, a netlist, or the like). A circuit may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may be embodied by or implemented as a circuit.

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to", unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Further, as used herein, reference to reading, writing, storing, buffering, and/or transferring data can include the entirety of the data, a portion of the data, a set of the data, and/or a subset of the data. Likewise, reference to reading, writing, storing, buffering, and/or transferring non-host data can include the entirety of the non-host data, a portion of the non-host data, a set of the non-host data, and/or a subset of the non-host data.

Finally, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps, or acts are in some way inherently mutually exclusive.

Aspects of the present disclosure are described below with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

In the following detailed description, reference is made to the accompanying drawings. The foregoing summary is illustrative only and is not intended to be in any way limiting. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

Examples of suitable non-volatile memory arrangements in which the systems and methods disclosed herein may be used are illustrated in FIGS. 1A-1C. That is, the following embodiments disclose non-volatile memory systems and devices and related methods for dynamically managing various host applications (e.g., data streams) based on minimum QoS requirements. Before turning to these and other embodiments, the following paragraphs provide some exemplary non-volatile memory systems, storage devices, and storage modules that can be used with such embodiments. It will be appreciated that any other suitable embodiments of non-volatile memory systems, devices, and/or storage modules may be used alone or in combination therewith, without limitation.

Referring now to FIG. 1A, an exemplary block diagram of a non-volatile memory system 100 is shown, in accordance with some embodiments. The non-volatile memory system 100 includes a storage device 120 (or a non-volatile storage device) with a controller 102 and a non-volatile memory that may be comprised of one or more non-volatile memory device 104 (also referred to as NV memory, memory, memory dies, and so on). In an embodiment, the non-volatile memory device 104 may include a set of non-volatile memory cells—and associated circuitry (or logic) for managing the physical operation of those non-volatile memory cells—that are formed on a single semiconductor substrate.

In embodiment, the controller 102 interfaces with a host 112 and transmits command sequences for read, program, and erase operations to the non-volatile memory device 104. The controller 102 may take the form of processing circuitry, a microprocessor or processor, and a computer-readable medium that stores computer-readable program code (e.g., software or firmware) executable by the (micro)processor, logic gates, switches, an application specific integrated circuit (ASIC), a programmable logic controller, and an embedded microcontroller, for example. The controller 102 may be configured with various hardware and/or firmware to perform the various functions described below and shown in the flow diagrams. Also, some of the components shown as being internal or external to the controller 102 can be respectively stored external or internal to the controller, and other components can be used.

In some embodiments, the controller 102 may be a flash memory controller or the like. A flash memory controller may be a device that manages data stored on flash memory and communicates with a host, such as a computer or electronic device. A flash memory controller can have functionality in addition to the specific functionality described herein. For example, the flash memory controller can format the flash memory to ensure the memory is operating properly, map out bad flash memory cells, and allocate spare cells to be substituted for future failed cells. Some part of the spare cells can be used to hold firmware to operate the flash memory controller and implement other features. In operation, when a host needs to read data from or write data to the flash memory, it will communicate with the flash memory controller. If the host provides a logical address to which data is to be read/written, the flash memory controller can convert the logical address received from the host to a physical address in the flash memory. Note that, alternatively, the host may provide the physical address. The flash memory controller can also perform various memory management functions, such as, but not limited to, wear leveling (i.e., distributing writes to avoid wearing out specific blocks of memory that would otherwise be repeatedly written to), garbage collection (i.e., after a block is full, moving only the valid pages of data to a new block, so the full block can be erased and reused), and/or any other similar memory management functions.

In some embodiments, the non-volatile memory device 104 may include any suitable storage device, medium, or element, including NAND flash memory cells and/or NOR flash memory cells. The memory cells can take the form of solid-state (e.g., flash) memory cells and can be one-time programmable, few-time programmable, or many-time programmable. Additionally, as noted above, the memory cells can also be single-level cells (SLCs), multi-level cells (MLCs), triple-level cells (TLCs), quad-level cells (QLCs), or use any other memory technologies, now known or later developed. Also, the memory cells can be arranged in a two-dimensional or three-dimensional configuration, without limitation.

The interface between the controller 102 and the non-volatile memory device 104 may be any suitable flash interface, such as a double data rate (DDR) interface or the like. In one embodiment, the non-volatile memory system 100 may be a card-based system, such as a secure digital (SD) or a micro secure digital (micro-SD) card. In an alternate embodiment, the non-volatile memory system 100 may be part of an embedded memory system.

Additionally, it should be noted that as shown in FIG. 1A, the non-volatile memory system 100 includes a single channel between the controller 102 and the non-volatile memory device 104. Although the illustrated embodiment shows a single-memory channel, any number of channels may be utilized without exceeding beyond the spirit and scope of the present disclosure. For example, in some NAND memory system architectures, 2, 4, 8 or more NAND channels may exist between the controller 102 and the NAND memory device(s) based on the controller capabilities. As such, in any of the other embodiments described herein, a single channel and/or two or more channels may exist between the controller and the memory die(s), even if a single channel is shown in the drawings.

In some embodiments, the storage device 120 along with the non-volatile memory device 104 and the controller 102 may be configured to be capable of dynamically managing various applications (e.g., data streams) (in various LBA range regions) based on minimum QoS requirements set by the host 112. For example, as described in greater detail in the embodiments below (e.g., in FIGS. 5A-5B and 6), the storage device 120 is also configured to: (i) schedule and arbitrate data based on the applications QoS, (ii) provide higher virtual throughput than it can actually physically support, and (iii) dynamically manage QoS requirements at the application level, including contention resolution and QoS priority for host applications.

Referring now to FIG. 1B, an exemplary block diagram of a storage module 200 is shown, in accordance with some embodiments. The storage module 200 includes a storage system 204 having a plurality of storage devices 120, in accordance with some embodiments. As such, the storage module 200 may include one or more non-volatile memory systems similar to the non-volatile memory system 100 in FIG. 1A. In an embodiment, the storage module 200 may include a storage controller 202 that interfaces with the host 111 and the storage system 204, which includes the non-volatile memory systems comprised of the storage devices 120, the non-volatile memory devices 104, and the controllers 102. The interface between storage controller 202 and the non-volatile memory systems (or the storage devices 120) may be a bus interface, such as a serial advanced technology attachment (SATA) or peripheral component interface express (PCIe) interface. In some embodiments, the storage module 200 may be a solid-state drive (SSD), as found in portable computing devices, such as laptop computers, and tablet computers.

Referring now to FIG. 1C, an exemplary block diagram of a hierarchical storage system 210 is shown, in accordance with some embodiments. In an embodiment, the hierarchical storage system 210 may include a plurality of storage controllers 202, each of which control a respective storage system 204. Additionally, the hierarchical storage system 210 may be communicatively coupled to one or more hosts 112 (or hosts systems) that may access memories within the hierarchical storage system 210 via a bus interface (or the like). In one embodiment, the bus interface may be a non-volatile memory express (NVMe), a fiber channel over Ethernet (FCoE) interface, or the like. In one embodiment, the hierarchical storage system 210 illustrated in FIG. 1C may be a rack mountable mass storage system that is accessible by multiple host computers, as would be found in a data center or other locations where mass storage is needed.

FIG. 2 illustrates a schematic block diagram of a computing system 201 with a host-computing device 112 (or a host 112) communicatively coupled to a storage device 120 that is configured to dynamically manage host applications (e.g., data streams, video content, etc.) based on minimum QoS requirements, in accordance with some embodiments. The computing system 201 may include one or more storage devices 120 in a storage system 224 that is communicatively coupled to the host-computing device 112 via a controller 102. The host-computing device 112 may include a processor 211, a volatile memory 212, and a communication interface 213. The processor 211 may include one or more central processing units, one or more general-purpose processors, one or more application-specific processors, one or more virtual processors (e.g., the host-computing device 112 may be a virtual machine operating within a host), one or more processor cores, or the like. The communication interface 213 may include one or more network interfaces configured to communicatively couple the host-computing device 112 and/or controller 226 of the storage device 120 to a network 215 (or a communication network), such as an Internet Protocol (IP) network, a Storage Area Network (SAN), a wireless or wired network, or the like.

In some embodiments, the storage device 120 may be disposed in one or more different locations relative to the host-computing device 112. In other embodiments, the storage device 120 may be disposed strictly within the storage system 224, where the storage system 224 and the host-computing device 112 are separate components that communicate over bus interfaces 245 and 255 (e.g., bus interfaces 245 and 255 may be used as virtual and actual throughputs, respectively). In one embodiment, the storage device 120 comprises one or more non-volatile memory devices (or dies) 104, such as semiconductor devices and/or any other similarly integrated circuit devices disposed on one or more PCBs, storage housings, and/or other mechanical and/or electrical support structures. For example, the storage device 120 may include one or more direct inline memory module (DIMM) cards, one or more expansion cards and/or daughter cards, a SSD or other hard drive device, and/or may have another memory and/or storage form factor. The storage device 120 may be integrated with and/or mounted on a motherboard of the host-computing device 112, installed in a port and/or slot of the host-computing device 112, installed on a different host-computing device 112 and/or a dedicated storage appliance on the network 215, in communication with the host-computing device 112 over an external bus (e.g., an external hard drive or the like), or the like.

In additional embodiments, the storage device 120 may be disposed on a memory bus of a processor 211 (e.g., on the same memory bus as the volatile memory 212, on a different memory bus from the volatile memory 212, in place of the volatile memory 212, or the like). In a further embodiment, the storage device 120 may be disposed on a peripheral bus of the host-computing device 112, such as a peripheral component interconnect express (PCI Express or PCIe) bus such as, but not limited to, a NVMe interface, a serial Advanced Technology Attachment (SATA) bus, a parallel Advanced Technology Attachment (PATA) bus, a small computer system interface (SCSI) bus, a FireWire bus, a Fibre Channel connection, a Universal Serial Bus (USB), a PCIe Advanced Switching (PCIe-AS) bus, or the like. In another embodiment, the storage device 120 may be disposed on a network 215, such as an Ethernet network, an Infiniband network, SCSI RDMA over a network, a storage area network (SAN), a local area network (LAN), a wide area network (WAN) such as the Internet, another wired and/or wireless network, or the like.

The host-computing device 112 may further comprise computer-readable storage medium 214. The computer-readable storage medium 214 may comprise executable instructions configured to cause the host-computing device 112 (e.g., processor 211) to perform steps of one or more of the methods disclosed herein. Additionally, or in the alternative, the buffering component 250 may be embodied as one or more computer-readable instructions stored on the computer-readable storage medium 214.

For some embodiments, the controller 102 (or a device driver) may present a logical address space 234 to the host clients 216. The logical address space 234 may comprise a plurality (e.g., range) of logical addresses. The logical address space 234 may refer to any identifier for referencing a memory resource (e.g., data), including, but not limited to: a logical block address (LBA), cylinder/head/sector (CHS) address, a file name, an object identifier, an inode, a Universally Unique Identifier (UUID), a Globally Unique Identifier (GUID), a hash code, a signature, an index entry, a range, an extent, or the like.

The controller 102 (or the driver) of the storage device 120 (or may maintain metadata 235, such as a logical to physical address mapping structure, to map logical addresses of the logical address space 234 to media storage locations on the storage device(s) 120. The controller 102 may be configured to provide storage services to one or more host clients 216. The host clients 216 may include local clients operating on the host-computing device 112 and/or remote clients 217 (or remote host clients) accessible via the network 215 and/or communication interface 213. The host clients 216 may include, but are not limited to: operating systems, file systems, database applications, server applications, kernel-level processes, user-level processes, applications, and the like.

The controller 102 may be further communicatively coupled to one or more storage systems 224 that may include different types and configurations of storage devices 120 such as, but not limited to, solid-state storage devices, semiconductor storage devices, SAN storage resources, or the like. The one or more storage devices 120 may comprise one or more respective controllers 102 and non-volatile memory channels 222. The controller 102 may provide access to the one or more storage devices 120 via any compatible protocols or interface 233 such as, but not limited to, SATA and PCIe. The metadata 235 may be used to manage and/or track data operations performed through the protocols or interfaces 233. The logical address space 234 may comprise a plurality of logical addresses, each corresponding to respective media locations of the one or more storage devices 120. The controller 102 may maintain metadata 235 comprising any-to-any mappings between logical addresses and media locations.

The controller 102 may further comprise and/or be in communication with a storage device interface 239 configured to transfer data, commands, and/or queries to the one or more storage devices 120 over a bus 225, which may include, but is not limited to, a memory bus of a processor 211, a PCI Express or PCIe bus, a serial Advanced Technology Attachment (ATA) bus, a parallel ATA bus, a small computer system interface (SCSI), FireWire, Fibre Channel, a Universal Serial Bus (USB), a PCIe Advanced Switching (PCIe-AS) bus, a network 215, Infiniband, SCSI RDMA, or the like. The storage device interface 239 may communicate with the one or more storage devices 120 using input-output control (IO-CTL) command(s), IO-CTL command extension(s), remote direct memory access, or the like.

The communication interface 213 may comprise one or more network interfaces configured to communicatively couple the host-computing device 112 and/or the controller 102 to a network 215 and/or to one or more remote clients 217. The host-computing device 112 may be in communication with the storage device 120 over a pair of bus interface 245 and 255 that may be used to transfer applications with QoS requirements such as a minimum throughput needed for some applications. The controller 102 may be part of and/or in communication with the one or more storage devices 120. Also, although FIG. 2 illustrates a single storage device 120, the computing system 201 and/or the storage system 224 are not limited in this regard and could be adapted to incorporate any number of storage devices 120.

The storage device 120 may comprise one or more non-volatile memory devices 104 of non-volatile memory channels 222, which may include, but is not limited to, ReRAM, Memristor memory, programmable metallization cell memory, phase-change memory (PCM, PCME, PRAM, PCRAM, ovonic unified memory, chalcogenide RAM, or C-RAM), NAND flash memory (e.g., 2D NAND flash memory, 3D NAND flash memory), NOR flash memory, nano random access memory (nano RAM or NRAM), nanocrystal wire-based memory, silicon-oxide based sub-10 nanometer process memory, graphene memory, Silico-Oxide-Nitride-Oxide-Silicon (SONOS), programmable metallization cell (PMC), conductive-bridging RAM (CBRAM), magneto-resistive RAM (MRAM), magnetic storage media (e.g., hard disk, tape), optical storage media, or the like. The one or more non-volatile memory devices 104 of the non-volatile memory channels 222, in certain embodiments, may comprise storage class memory (SCM) (e.g., write in place memory, or the like).

While the non-volatile memory channels 222 may be referred to as "memory media" in various embodiments, the non-volatile memory channels 222 may more generally comprise one or more non-volatile recording media capable of recording data that may be referred to as a non-volatile memory medium, a non-volatile storage medium, or the like. Further, the storage device 120, in various embodiments, may comprise a non-volatile recording device, a non-volatile memory array, a plurality of interconnected storage devices in an array, or the like.

The non-volatile memory channels 222 may comprise one or more non-volatile memory devices 104, which may include, but are not limited to, chips, packages, planes, die, or the like. The controller 102 may be configured to manage data operations on the non-volatile memory channels 222, and may comprise one or more processors, programmable processors (e.g., FPGAs), ASICs, micro-controllers, or the like. In some embodiments, the controller 102 may be configured to store data on and/or read data from the non-volatile memory channels 222, to transfer data to/from the storage device 120, and so on.

The controller 102 may be communicatively coupled to the non-volatile memory channels 222 by way of a bus 227. The bus 227 may comprise an I/O bus for communicating data to/from the non-volatile memory devices 104. The bus 227 may further comprise a control bus for communicating addressing and other command and control information to the non-volatile memory devices 104. In some embodiments, the bus 227 may communicatively couple the non-volatile memory devices 104 to the controller 102 in parallel. This parallel access may allow the non-volatile memory devices 104 to be managed as a group, forming a non-volatile memory array 229. The non-volatile memory devices 104 may be partitioned into their respective logical memory units (e.g., logical pages) and/or logical memory divisions (e.g., logical blocks and logical planes). The logical memory units may be formed by logically combining physical memory units of each of the non-volatile memory devices 104.

The controller 102 may organize a block of word lines within a non-volatile memory device 104, in certain embodiments, using addresses of the word lines, such that the word lines are logically organized into a monotonically increasing sequence (e.g., decoding and/or translating addresses for word lines into a monotonically increasing sequence, or the like). In a further embodiment, word lines of a block within a non-volatile memory device 123 may be physically arranged in a monotonically increasing sequence of word line addresses, with consecutively addressed word lines also being physically adjacent (e.g., WL0, WL1, WL2, . . . WLN).

The controller 102 may compromise and/or be in communication with a device driver that is being executed on the host-computing device 112. For example, the controller 102 and/or such device driver may provide storage services to the host clients 216 via one or more interfaces 233. Likewise, the controller 102 and/or such device driver may further comprise a storage device interface 239 that is configured to transfer data, commands, and/or queries to the controller 102 over the bus 225, as described above.

Figure 3A:
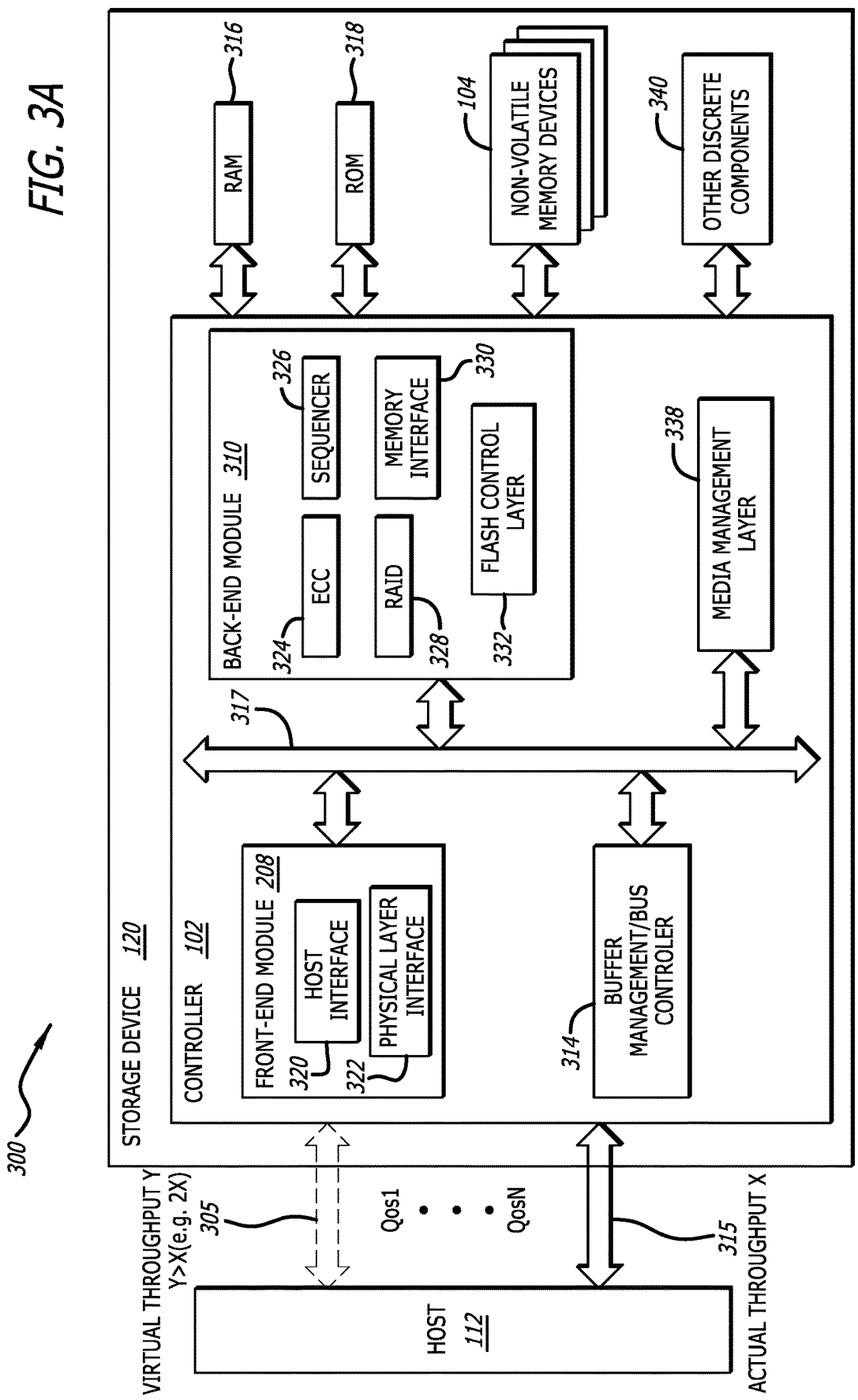
FIG. 3A illustrates a schematic block diagram of an embodiment of a controller of a storage device configured to dynamically manage QoS applications, in accordance with an embodiment of the disclosure.

Referring now to FIG. 3A, a schematic block diagram of a system 300 illustrates exemplary components of the storage device 120 in greater detail, according to some embodiments. The controller 102 may include a front-end module 308 that interfaces with the host 112, a back-end module 310 that interfaces with the non-volatile memory device(s) (or die(s)) 104, and various other modules that perform various functions of the non-volatile memory system 100. For example, the controller 102 may be communicatively coupled to the host 112 over a virtual throughput 305 and an actual throughput 315, where such throughputs 305 and 315 may include one or more additional throughputs (e.g., $QoS_1$-$QoS_N$). In some embodiments, the host 112 in FIGS. 3A-3B may be substantially similar to the host(s) described above in FIGS. 1A-1C and 2.

In general, a module may be hardware or a combination of hardware and software. For example, each module may include an application specific integrated circuit (ASIC), a field programmable gate array (FPGA), a circuit, a digital logic circuit, an analog circuit, a combination of discrete circuits, gates, or any other type of hardware or combination thereof. In addition, or alternatively, each module may include memory hardware that comprises instructions executable with a processor or processor circuitry to implement one or more of the features of the module. When any of the one or more modules includes the portion of the memory that comprises instructions executable with the processor, the module may or may not include the processor. In some examples, each module may just be the portion of the memory that comprises instructions executable with the processor to implement the features of the corresponding module without the module including any other hardware. Because each module includes at least some hardware even when the included hardware comprises software, each module may be interchangeably referred to as a hardware module.

The controller 102 may include a buffer management/bus controller 314 that manages buffers in random access memory (RAM) 316 and controls the internal bus arbitration for communication on an internal communications bus 317 of the controller 102. A read only memory (ROM) 318 may store and/or access system boot code. Also, although both the RAM 316 and ROM 318 in FIG. 3A are illustrated as located separately from the controller 102, the RAM 316 and/or the ROM 318 may be located within the controller 102 in other embodiments. In yet another embodiment, portions of the RAM 316 and/or the ROM 318 may be located both within the controller 102 and outside the controller 102. Further, in some implementations, the controller 102, the RAM 316, and the ROM 318 may be located on separate semiconductor devices (or dies).

Additionally, the front-end module 308 may include a host interface 320 and a physical layer interface 322 that provide the electrical interface with the host or next level storage controller. The choice of the type of the host interface 320 can depend on the type of memory being used. Examples types of the host interface 320 may include, but are not limited to, SATA, SATA Express, SAS, Fibre Channel, USB, PCIe, and NVMe. The host interface 320 may typically facilitate transfer for data, control signals, and timing signals.

The back-end module 310 may include an error correction controller (ECC) engine 324 that encodes the data bytes received from the host and decodes and error corrects the data bytes read from the non-volatile memory device(s) 104. As discussed below, the ECC engine 324 may be tunable, so as to generate varying amounts of ECC data based on the mode (e.g., generate normal mode ECC data in normal programming mode and generate mixed mode ECC data in mixed mode programming mode, with the mixed mode ECC data being greater than the normal mode ECC data). The back-end module 310 may also include a command sequencer 326 that generates command sequences, such as program, read, and erase command sequences, to be transmitted to the non-volatile memory device(s) 104.

Additionally, the back-end module 310 may include a RAID (Redundant Array of Independent Drives) module 128 that manages generation of RAID parity and recovery of failed data. The RAID parity may be used as an additional level of integrity protection for the data being written into the non-volatile memory system 100. In some cases, the RAID module 328 may be a part of the ECC engine 324. A memory interface 330 provides the command sequences to the non-volatile memory device(s) 104 and receives status information from the non-volatile memory device(s) 104. Along with the command sequences and status information, data to be programmed into and read from the non-volatile memory device(s) 104 may be communicated through the memory interface 130. In one embodiment, the memory interface 330 may be a double data rate (DDR) interface. A flash control layer 332 may control the overall operation of the back-end module 310.

Additional modules of the non-volatile memory system 100 illustrated in FIG. 2A may include a media management layer 338, which performs wear leveling of memory cells of the non-volatile memory device 104. The non-volatile memory system 100 may also include other discrete components 340, such as external electrical interfaces, external RAM, resistors, capacitors, or other components that may interface with controller 102. In alternative embodiments, one or more of the RAID modules 328, media management layer 338, and the buffer management/bus controller 314 are optional components that may not be necessary in the controller 102.

Figure 3B:
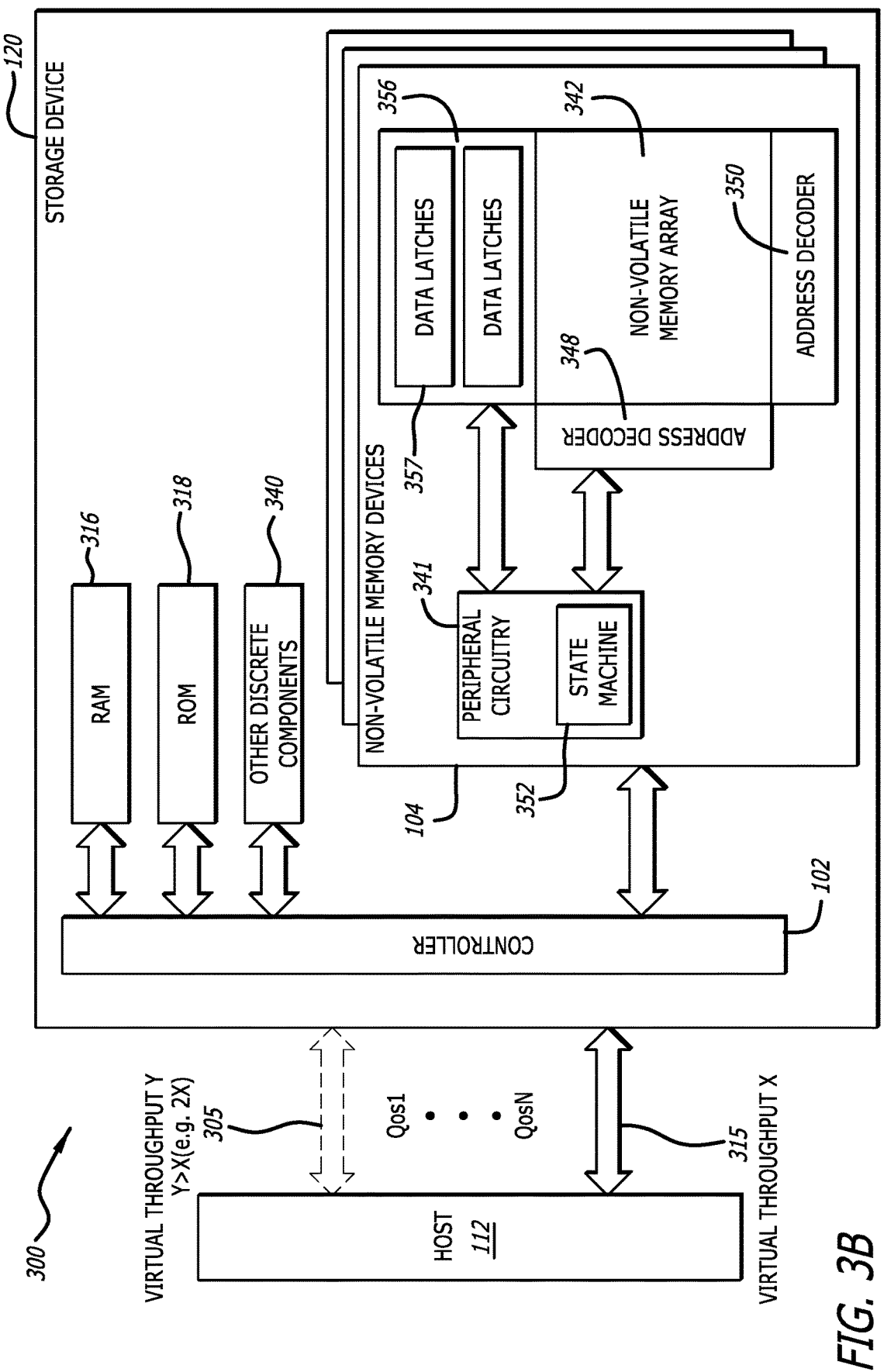
FIG. 3B illustrates a schematic block diagram of an embodiment of a non-volatile memory device of a storage device configured to dynamically manage QoS applications, in accordance with an embodiment of the disclosure.

Referring to FIG. 3B, a schematic block diagram illustrates exemplary components of the storage device 120 in greater detail, according to some embodiments. The storage device may be communicatively coupled to the host 112 over a virtual throughput 305 and an actual throughput 315, where such throughputs 305 and 315 may include one or more additional throughputs (e.g., $QoS_1$-$QoS_N$). The non-volatile memory device 104 may include a non-volatile memory array 342. The non-volatile memory array 342 may include a plurality of non-volatile memory elements or cells, each configured to store one or more bits of data. The non-volatile memory elements or cells may be any suitable non-volatile memory cells, including NAND flash memory cells and/or NOR flash memory cells in a two-dimensional configuration and/or a three-dimensional configuration. The memory cells may take the form of solid-state (e.g., flash) memory cells and can be one-time programmable, few-time programmable, or many-time programmable. In addition, as described above, the memory elements or cells may be configured as SLCs that store a single bit of data per cell, multi-level cells MLCs that store multiple bits of data per cell, or combinations thereof. For example, in these embodiments, the MLCs include TLCs, QLCs, and so on, that store three, four, and more than four bits of data per cell.

Additionally, a flash memory cell may include within the non-volatile memory array 342 a floating gate transistor (FGT) that has a floating gate and a control gate. The floating gate is surrounded by an insulator or insulating material that helps retain charge in the floating gate. The presence or absence of charges inside the floating gate may cause a shift in a threshold voltage of the FGT, which is used to distinguish logic levels. That is, each FGT's threshold voltage may be indicative of the data stored in the memory cell. Hereafter, FGTs, memory elements, and memory cells may be used interchangeably to refer to the same physical entity.

For example, the SLCs and the TLCs/QLCs may be disposed in the non-volatile memory array 342 in accordance with a matrix-like structure of rows and columns of memory cells. At the intersection of a row and a column is a FGT (or memory cell). A column of FGTs may be referred to as a string. FGTs in a string or column may be electrically connected in series, whereas, a row of FGTs may be referred to as a page. Control gates of FGTs in a page or row may be electrically connected or otherwise coupled together.

The non-volatile memory array 342 may also include word lines and bit lines connected to the FGTs. Each page of FGTs is coupled to a word line. In particular, each wordline may be coupled to the control gates of FGTs in a page. In addition, each string of FGTs may be coupled to a bit line. Further, a single string may span across multiple word lines, and the number of FGTs in a string may be equal to the number of pages in a block.

In some embodiments, the non-volatile memory devices 104 may include a peripheral circuitry 341 with a state machine 352 that provides status information to controller 102. The non-volatile memory device 104 further includes a data cache 356 that caches data. The non-volatile memory device 104 may also include a row address decoder 348 and a column address decoder 350. The row address decoder 348 may decode a row address and select a particular word line in the non-volatile memory array 342 when reading or writing data to/from the memory cells in the non-volatile memory array 342. The column address decoder 350 may decode a column address to select a particular group of bit lines in the non-volatile memory array 342 to be electrically coupled to the data cache 344.

The data cache 356 may include sets of data latches 357 for each bit of data in a memory page of the non-volatile memory array 342. Thus, each set of data latches 357 may be a page in width, and a plurality of sets of data latches 357 may be included in the data cache 356. Additionally, in other embodiments, the controller 102 may be implemented in as a single integrated circuit chip and may communicate with the one or more different layers of memory in the non-volatile memory device 104 over one or more command channels. Note that, in other embodiments, controller executable code for implementing memory management instructions as described herein may be stored in the non-volatile flash memory.

Moreover, as described herein, the non-volatile memory array 342 may be arranged in blocks of memory cells in which one block of memory cells is the unit of erase, i.e., the smallest number of memory cells that are physically erasable together. For increased parallelism, however, the blocks may be operated in larger metablock (MB) units. One block from each of at least two planes of memory cells may be logically linked together to form a metablock.

Figure 4:
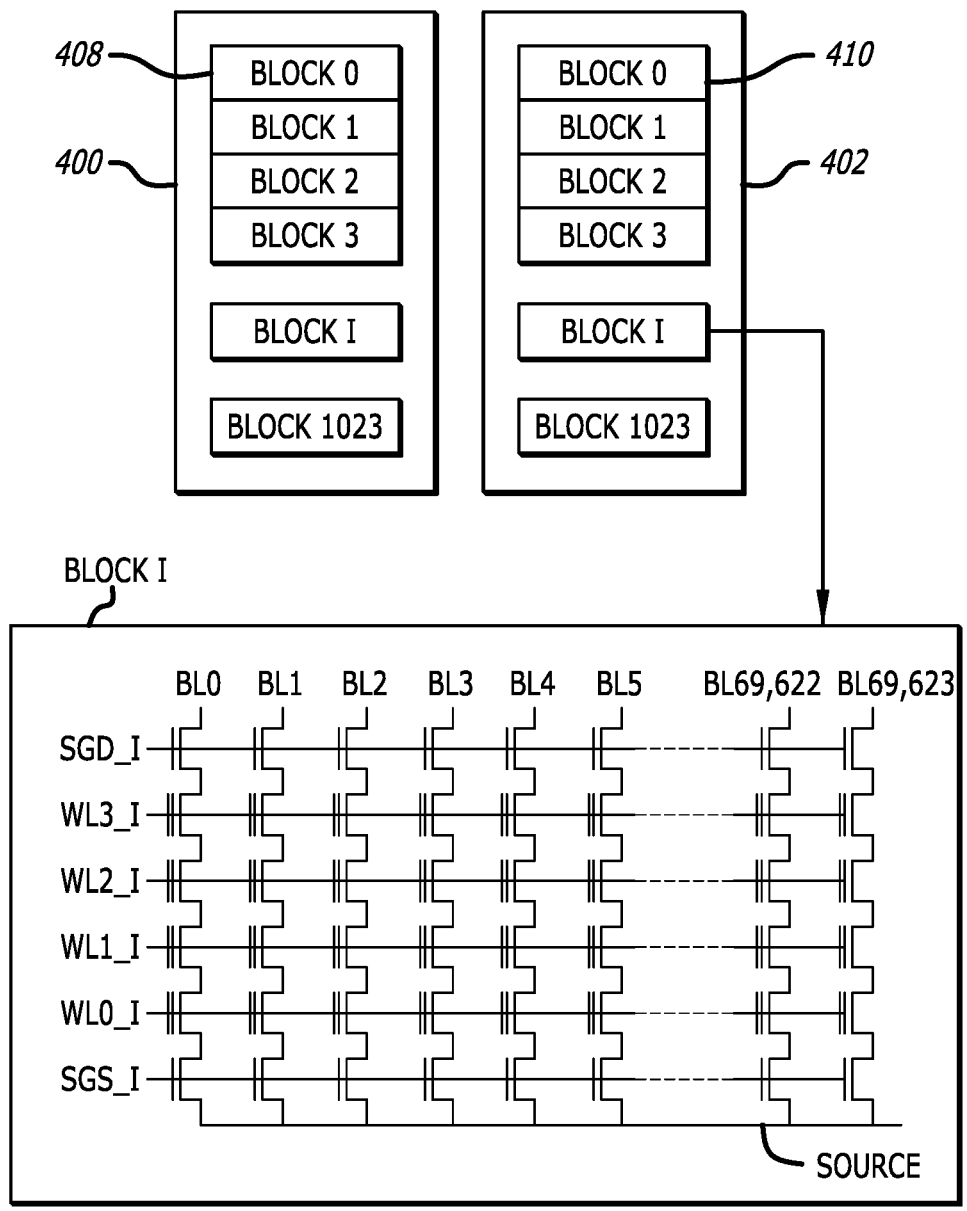
FIG. 4 illustrates a schematic block diagram of planes in a memory structure, in accordance with an embodiment of the disclosure.

Referring now to FIG. 4, a block diagram illustration of two planes 400 and 402 is shown, in accordance with some embodiments. Planes 400 and 402 may be a part of a memory structure or the like. For example, planes 400 and 402 may be a part of the non-volatile memory device 104 depicted in FIGS. 1A, 2, and 3A-3B, where the non-volatile memory device 104 may include planes 400 and 402 in conjunction with a plurality of other planes.

In some embodiments, the planes 400 and 402 may be divided into a large number of blocks 408 and 410 (e.g., blocks 0-1023, or another amount). Each block 408 and 410 includes a plurality memory cells. In one embodiment, each block 408 and 410 is the unit of erase and, therefore, is sometimes referred to as an erase block. That is, each block contains the minimum number of memory cells that are erased together. Other units of erase can also be used. A block may contain a set of NAND stings which are accessed via bit lines (e.g., bit lines BL0-BL69,623) and word lines (WL0, WL1, WL2, WL3). For example, Block I shows four memory cells connected in series to form a NAND string. Although four memory cells are depicted to be included in each NAND string, more or less than four memory cells may be used (including, by way of non-limiting example, 16, 32, 64, 128, 256 or another number or memory cells). One terminal of the NAND string is connected to a corresponding bit line via a drain select gate (connected to select gate drain line SGD), and another terminal is connected to the source line via a source select gate (connected to select gate source line SGS). Although 69624 bit lines are shown in FIG. 4, it will be appreciated that any number of bit lines may also be used without limitation. Additionally, as discussed above, the block can implement non-volatile storage technologies other than NAND flash memory.

Each block 408 and 410 is typically divided into a plurality of pages. In one embodiment, a page is a unit of programming. Other units of programming can also be used. One or more pages of data are typically stored in one row of memory cells. For example, one or more pages of data may be stored in memory cells connected to a common word line. One example of a page can be all of the data stored in the memory cells connected to a common word line and in a common block. Another example of a page is a fraction (e.g., ¼, ½, ⅓) of the memory cells connected to a common word line and in a common block or a fraction of the bits stored in those memory cells. A page includes user data and overhead data (also called system data). Overhead data typically includes header information and ECC calculated from the user data of the sector. The controller (or other component) calculates the ECC when data is being programmed into the array, and also checks it when data is being read from the array.

The memory systems discussed above can be erased, programmed and read. At the end of a successful programming process (with verification), the threshold voltages of the memory cells should be within one or more distributions of threshold voltages for programmed memory cells or within a distribution of threshold voltages for erased memory cells, as appropriate. For example, the memory systems may use threshold voltage distributions for a memory cell array when each memory cell stores three bits of data. Other embodiments, however, may use other data capacities per memory cell (e.g., such as one, two, four, or five bits of data per memory cell).

Figure 5A:
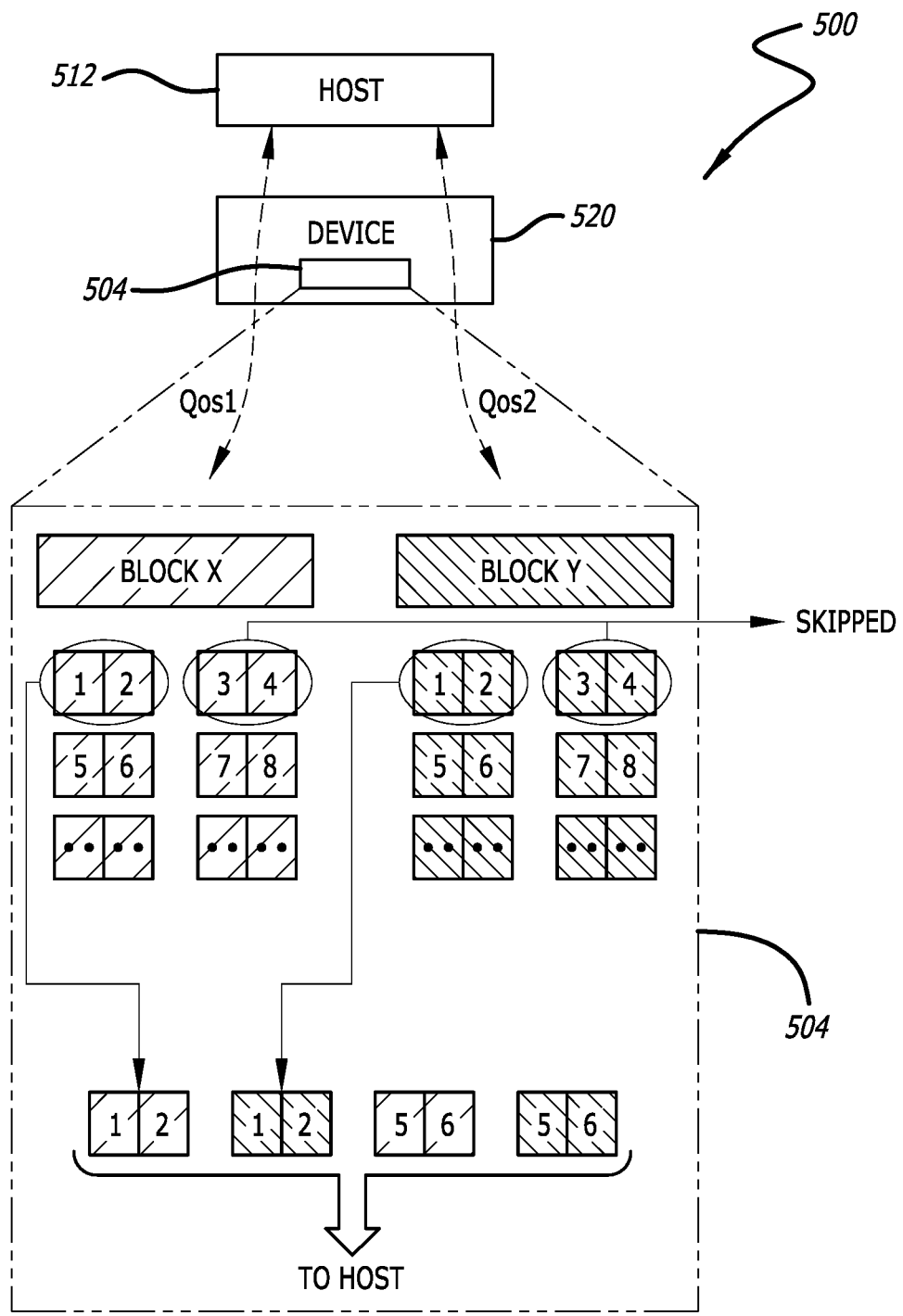
FIG. 5A illustrates an exemplary schematic block diagram of a host, a device, and a plurality of throughputs, in accordance with an embodiment of the disclosure.
Figure 5B:
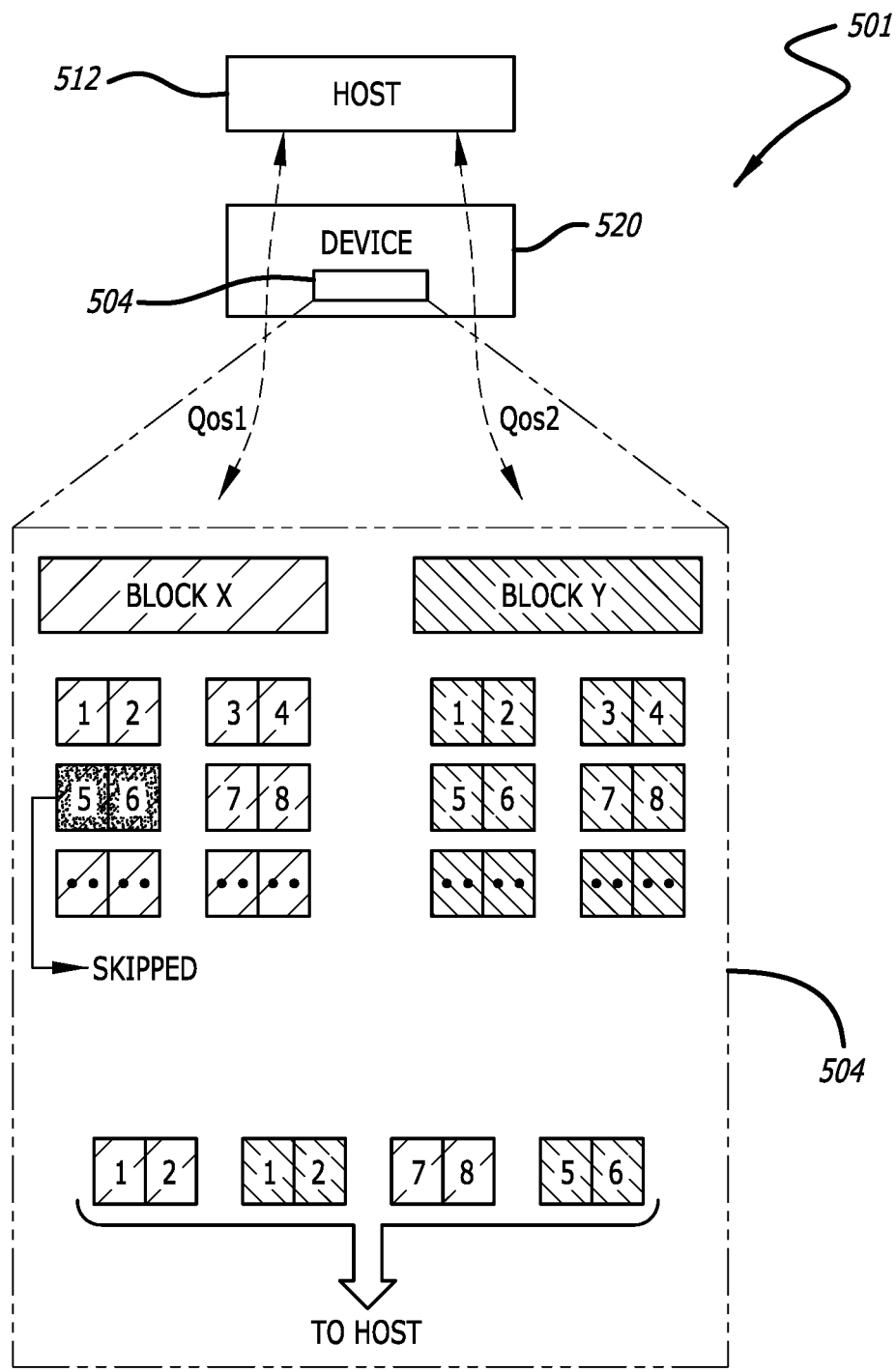
FIG. 5B illustrates an exemplary schematic block diagram of a host, a device, and a plurality of throughputs, in accordance with an embodiment of the disclosure.
Figure 6:
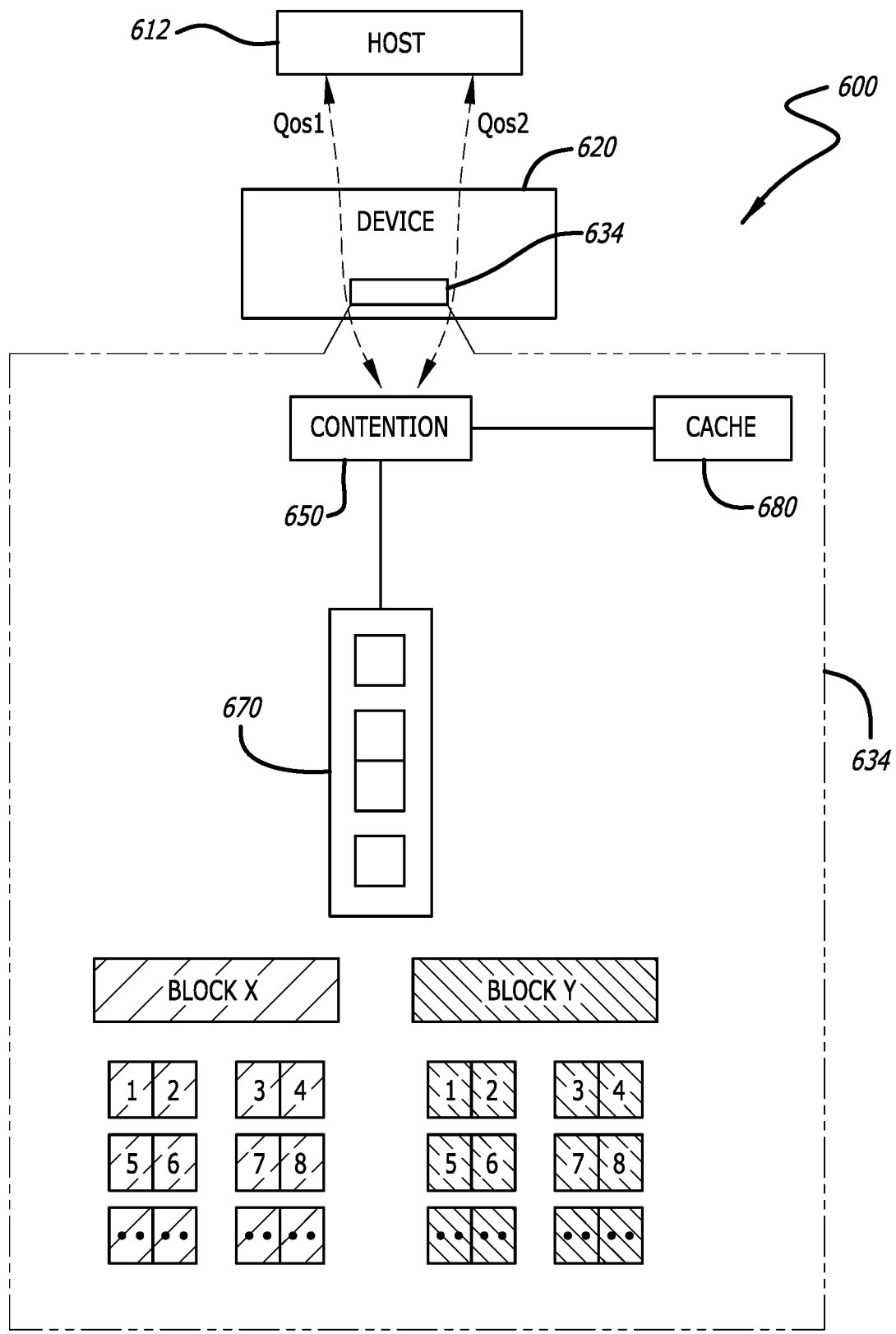
FIG. 6 illustrates an exemplary schematic block diagram of a host, a device, and a plurality of throughputs, in accordance with an embodiment of the disclosure.

Examples of suitable host and device QoS arrangements in which the systems and methods disclosed herein may be used are illustrated in FIGS. 5A-5B and 6. That is, the following embodiments disclose storage devices, systems, and related methods for dynamically managing various host applications (e.g., data streams) based on minimum QoS requirements. Before turning to these and other embodiments, the following paragraphs provide some exemplary non-volatile memory systems with host-computing devices and storage devices that can be used with such embodiments. It will be appreciated that any other suitable embodiments of non-volatile memory systems, devices, and/or storage modules may be used alone or in combination therewith, without limitation.

Referring now to FIG. 5A, an exemplary schematic block diagram of a system 500 is shown, in accordance with some embodiments. In one embodiment, the system 500 may include a host 512, a device 520, and a non-volatile memory device 504. The host 512, the device 520, and the non-volatile memory device 504 in FIG. 5B may be substantially similar to the host 112, the device 120, and the non-volatile memory device 104 described above with regard to FIGS. 1A, 2, and 3A-3B. Some of the main embodiments described herein are based on the exemplary schematic block diagram illustration of the system 500.

In some embodiments, the system 500 allows the device 520 to be communicatively coupled with the host 512 so as to provide a virtual throughput for the device 520 that is greater than its actual physical throughput. For example, if the actual physical throughput is "X" for the total amount of data transferred by the device 520 to the host 512, the virtual throughput may be equal to "2X" for the amount of total data acknowledged by the device 520 based on the QoS applications sent by the host 512.

In some embodiments, the system 500 allows the device 520 to be communicatively coupled with the host 512 so as to provide the device 520 with scheduling and arbitration of the data associated with the QoS applications sent by the host 512. For example, as noted above, the device 520 can be used to manage various applications (in various LBA range regions) based on the minimum QoS requirements of the host 512. For example, the device 520 in FIG. 5A may initially establish or determine the minimum QoS requirements for each application of the host 512, which may include, but is not limited to, the minimum QoS requirements (or minimum throughput) for video content, video quality, streams, and so on.

Furthermore, the device 520 may decide to meet the minimum QoS requirements for each application, and, if extra bandwidth is still available after meeting the minimum QoS requirements, the device 520 may then try to maximize the overall QoS of the applications. While doing so, the total data acknowledged by the device 520 (e.g., the virtual throughput may identify 30 frames/second) may be higher than the actual data transferred back to the host 512 (e.g., the actual throughput transferred back to the host may indicate 25 frames/second). As a result of these two possibly different data values, the device 520 may provide the host 512 with the higher of the two throughput values without being aware of the actual media type or application being transferred by the host 512.

By placing intelligence in the device 520 to manage the various applications of the host 512 based on the QoS of each application, the device 520 is capable of (i) choosing to transfer the data which is required (e.g., for applications where the device 520 determines that the minimum QoS is 100%), and (ii) choosing to skip other portions of the data that may be considered additional, superflous, and so on (e.g., data interleaving, package formation, host-side errors) to increase the overall virtual throughput while maintaining a lower cost.

For example, referring back to FIG. 5A, the device 520 has chosen to skip data found in the non-volatile memory device 504, where the skipped data is illustrated as two shared units per block (i.e., unit numbers 3 and 4 in Blocks X and Y). As such, the device 520 will have a higher virtual throughput compared to the actual throughput, as the total data of the string transferred back to the host 512 will be missing one or more portions that were skipped by the device 520. Also, although two blocks and four skipped units were shown in FIG. 5A, the device 520 may utilize less or more than two blocks and skip less or more than four units (or two units per block) if needed.

Referring now to FIG. 5B, an exemplary schematic block diagram of a system 501 is shown, in accordance with some embodiments. In one embodiment, the system 501 may include a host 512, a device 520, and a non-volatile memory device 504. The system 501 may be substantially similar to the system 500 described above in FIG. 5A. The host 512, the device 520, and the non-volatile memory device 504 in FIG. 5B may be substantially similar to the host 512, the device 520, and the non-volatile memory device 504 described above in FIG. 5B. Some of the main embodiments described herein are based on the exemplary schematic block diagram illustration of the system 501.

In some embodiments, the system 501 allows the device 520 to be communicatively coupled with the host 512 so as to provide a virtual throughput for the device 520 that is greater than its actual physical throughput. Furthermore, in some embodiments, the system 500 allows the device 520 to be communicatively coupled with the host 512 so as to provide the device 520 with scheduling and arbitration of the data associated with the QoS applications sent by the host 512.

By placing intelligence in the device 520 to manage the various applications of the host 512 based on the QoS of each application, the device 520 is capable of (i) choosing to transfer the data which is required (e.g., for applications where the device 520 determines that the minimum QoS is 100%), and (ii) choosing to skip other portions of the data that may be considered additional, superflous, and so on (e.g., data interleaving, package formation, host-side errors) to increase the overall virtual throughput while maintaining a lower cost.

For example, referring back to FIG. 5B, the device 520 has chosen to skip data found in the non-volatile memory device 504. In this example, the skipped data is a packet with high errors (i.e., unit numbers 5 and 6 in Block X) in which the device 520 will not perform error correction to recover the packet. Instead, the device 520 choose to skip this packet (i.e., unit numbers 5 and 6 in Block X) from being transferred back to the host 512 and instead moved on to start choosing other data to add to the string of data that will be transferred back to the host 512. Similar to the example illustrated in FIG. 5A, here, the device 520 will have a higher virtual throughput compared to the actual throughput, as the total data transferred back to the host 512 is missing one or more error packets. Also, although two blocks and two skipped units were shown in FIG. 5B, the device 520 may utilize less or more than two blocks and skip less or more than two units per block if needed.

Referring now to FIG. 6, an exemplary schematic block diagram of a system 600 is shown, in accordance with some embodiments. In one embodiment, the system 600 may include a host 612, a device 620, and a non-volatile memory device 634. The system 600 may be substantially similar to the systems 500-501 described above in FIGS. 5A-5B. Likewise, the host 612, the device 620, and the non-volatile memory device 634 in FIG. 6 may be substantially similar to the host 612, the device 620, and the non-volatile memory device 634 described above in FIGS. 5A-5B. Some of the main embodiments described herein are based on the exemplary schematic block diagram illustration of the system 600.

In some embodiments, the system 600 allows the device 620 to be communicatively coupled with the host 612 so as to provide a virtual throughput for the device 620 that is greater than its actual physical throughput. Furthermore, in some embodiments, the system 600 allows the device 620 to be communicatively coupled with the host 612 so as to provide the device 620 with scheduling and arbitration of the data associated with the QoS applications sent by the host 612. Additionally, in some embodiments, the system 600 allows the device 620 to be communicatively coupled with the host 612 so as to provide the device 620 with dynamic QoS management at the application level, which includes allowing the device 620 to operate a contention resolution priority queue. For example, the device 620 may operate a dynamic QoS management component (or module) that allows the device 620 to change (or maintain, observe, fetch, etc.) one or more QoS requirements of an application over a NAND/device bus or the like.

By placing intelligence in the device 620 to manage the various applications of the host 512 based on the QoS of each application, the device 520 is capable of (i) choosing to transfer the data which is required (e.g., for applications where the device 520 determines that the minimum QoS is 100%), (ii) choosing to skip other portions of the data that may be considered additional, superflous, and so on (e.g., data interleaving, package formation, host-side errors) to increase the overall virtual throughput while maintaining a lower cost, and (iii) operating a contention resolution priority queue using the non-volatile memory device 634.

For example, referring back to FIG. 6, when multiple applications have contentions for the shared resources, the device 620 may prioritize the application(s) using the contention module 650 to prioritize the applications with higher QoS requirements and add them to a shared queue used for scheduling 670. Additionally, the device 620 may also dynamically manage the cache 680 when there are contentions between the shared resources. In some embodiments, when the bandwidth is later made available, the device 620 may forward the optional content back to the host 612. Also, although two blocks were shown in FIG. 6, the device 620 may utilize less or more than two blocks if needed.

Information as shown and described in detail herein is fully capable of attaining the above-described object of the present disclosure, the presently preferred embodiment of the present disclosure, and is, thus, representative of the subject matter that is broadly contemplated by the present disclosure. The scope of the present disclosure fully encompasses other embodiments that might become obvious to those skilled in the art, and is to be limited, accordingly, by nothing other than the appended claims. Any reference to an element being made in the singular is not intended to mean "one and only one" unless explicitly so stated, but rather "one or more." All structural and functional equivalents to the elements of the above-described preferred embodiment and additional embodiments as regarded by those of ordinary skill in the art are hereby expressly incorporated by reference and are intended to be encompassed by the present claims.

Moreover, no requirement exists for a system or method to address each and every problem sought to be resolved by the present disclosure, for solutions to such problems to be encompassed by the present claims. Furthermore, no element, component, or method step in the present disclosure is intended to be dedicated to the public regardless of whether the element, component, or method step is explicitly recited in the claims. Various changes and modifications in form, material, work-piece, and fabrication material detail can be made, without departing from the spirit and scope of the present disclosure, as set forth in the appended claims, as might be apparent to those of ordinary skill in the art, are also encompassed by the present disclosure.

What is claimed is:

1. A storage device, comprising:
   one or more communication channels suitable for connection with a plurality of host devices;
   a plurality of memory devices within a memory array;
   a host interface, configured to receive and transmit multiple data streams from and to the plurality of host devices, each data stream having a corresponding service level agreement (SLA) measured by a corresponding quality of service (QoS);
   a plurality of controllers configured to receive commands sent from a sending host of the plurality of host devices;
   a dynamic management interface, executed by at least one of the plurality of controllers, configured to manage each received data stream with the corresponding QoS and associate each received data stream to the sending host;
   a dynamic QoS control module coupled with the dynamic management interface and the host interface;
   a contention module configured to prioritize one or more applications having one or more contentions with respect to a plurality of shared resources, wherein the one or more applications are prioritized based on a corresponding QoS requirement;
   the contention module coupled with a cache configured to cache data from the data stream, wherein the storage device is configured to manage the cache when there are contentions between the plurality of shared resources;
   wherein the one or more applications are added to a shared queue used for scheduling;
   wherein upon determining that bandwidth is available, the storage device forwards the received data streams back to the sending host; and
   wherein the storage device is configured to:
   (i) transfer portions of the data streams where a minimum QoS is 100%;

(ii) skip superfluous portions of the data streams to increase virtual throughput; and (iii) operate a contention resolution priority queue using a non-volatile memory device.

2. The storage device of claim 1, wherein the storage device comprises a Solid State Drive (SSD) storage device.

3. The storage device of claim 1, wherein the plurality of host devices are virtual host devices.

4. The storage device of claim 1, wherein each data stream corresponds to a partition in the memory array.

5. The storage device of claim 1, wherein the dynamic management interface is configured to determine one or more minimum QoS requirements for each corresponding QoS of each received data stream.

6. The storage device of claim 5, wherein the one or more minimum QoS requirements comprises anyone of read bandwidth, read latency, write bandwidth, and write latency requirements.

7. The storage device of claim 1, wherein the dynamic QoS control module is configured to receive first requests for a first data stream and second requests for a second data stream from the sending host.

8. The storage device of claim 7, wherein the dynamic QoS control module is configured to acknowledge a total data received from the second requests for the second stream from the sending host.

9. The storage device of claim 7, wherein the dynamic QoS control module is configured to transfer back to the sending host an actual data for the second stream that is less than the total data received from the second requests for the second stream from the sending host.

10. The storage device of claim 7, wherein the dynamic QoS control module is operative to schedule the first requests and second requests in a manner that may satisfy a first QoS attribute for the first stream and a second QoS attribute for the second stream.

11. The storage device of claim 6, wherein each QoS attribute is drawn from at least one or more of the minimum QoS requirements.

12. A storage device, comprising:
one or more communication channels suitable for connection with a plurality of host devices;
a plurality of memory devices within a memory array;
a host interface, configured to receive and transmit multiple data streams from and to the plurality of host devices, each data stream having a corresponding service level agreement (SLA) measured by a corresponding quality of service (QoS);
a plurality of controllers configured to receive commands sent from a sending host of the plurality of host devices;
a dynamic management interface, executed by at least one of the plurality of controllers, configured to manage each received data stream with the corresponding QoS and associate the received data stream to the sending host;
a dynamic QoS control module coupled with the dynamic management interface and the host interface, wherein the dynamic QoS control module is configured to receive first requests for a first data stream and second requests for a second stream from the sending host;
a contention module configured to prioritize one or more data streams of the multiple data streams having one or more contentions with respect to a plurality of shared resources, wherein the one or more data streams are prioritized based on a corresponding QoS requirement;
the contention module coupled with a cache configured to cache data from the data streams, wherein the storage device is configured to manage the cache when there are contentions between the plurality of shared resources;
wherein the one or more data streams are added to a shared queue used for scheduling;
wherein upon determining that bandwidth is available, the storage device forwards the received data streams back to the sending host; and
wherein the storage device is configured to:
(i) transfer portions of the data streams where a minimum QoS is 100%;
(ii) skip superfluous portions of the data streams to increase virtual throughput; and
(iii) operate a contention resolution priority queue using a non-volatile memory device.

13. The storage device of claim 12, wherein a first data stream has a first level of QoS, wherein a second data stream has a second level of QoS, wherein the first level of QoS is greater than the second level of QoS, and wherein a first priority ranking is assigned to the first data stream based on the first level of QoS being greater than the second level of QoS.

14. The storage device of claim 12, wherein the dynamic management interface is configured to determine one or more minimum QoS requirements for each corresponding QoS of each received data stream.

15. The storage device of claim 14, wherein the one or more minimum QoS requirements includes read bandwidth, read latency, write bandwidth, and write latency requirements.

16. The storage device of claim 15, wherein the dynamic QoS control module is configured to acknowledge a total data received from the second requests for the second stream from the sending host.

17. The storage device of claim 16, wherein the dynamic QoS control module is configured to transfer back to the sending host an actual data for the second stream that is less than the total data received from the second request for the second stream from the sending host, and wherein the dynamic QoS control module is operative to schedule the first requests and second requests in a manner that may satisfy a first QoS attribute for the first stream and a second QoS attribute for the second stream.

18. A method of managing QoS requirements, comprising:
receiving an identifier for a first data stream and an identifier for a second data stream from a host;
receiving first requests for the first data stream and second requests for the second data stream from the host; and
upon determining that bandwidth is available, forwarding a received data stream back to the host;
wherein the identifier for the first data stream further identifies a total data acknowledged from the first requests for the first data stream from a sending host,
wherein the total data acknowledged from the first requests for the first data stream is greater than an actual data transferred back to the host;
wherein the first and second data streams are prioritized using a contention module based on a corresponding QoS requirement in response to contention with respect to a plurality of shared resources;
caching data from the first and second data streams using a cache coupled with the contention module;
managing the cache when there are contentions between the plurality of shared resources;
wherein the first and second data streams are added to a shared queue used for scheduling;

transferring portions of the first and second data streams where a minimum QoS is 100%;
skipping superfluous portions of the first and second data streams to increase virtual throughput; and
operating a contention resolution priority queue using a non-volatile memory device.

\* \* \* \* \*